(12) United States Patent
Osawa (10) Patent No.: US 6,285,141 B1
(45) Date of Patent: Sep. 4, 2001

(54) DEFLECTION YOKE AND CATHODE RAY TUBE

(75) Inventor: Yukitaka Osawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/534,531

(22) Filed: Mar. 27, 2000

(30) Foreign Application Priority Data

Mar. 29, 1999 (JP) .................................................. 11-085140

(51) Int. Cl.⁷ ....................................................... G09G 1/28
(52) U.S. Cl. ................................ 315/368.28; 315/368.25; 315/370; 315/364; 313/440
(58) Field of Search ........... 315/368.28, 368.25–368.27, 315/368.11, 364, 370; 313/440, 412

(56) References Cited

U.S. PATENT DOCUMENTS

| | | | |
|---|---|---|---|
| 4,881,015 | * 11/1989 | Shimoma et al. | .................... 315/371 |
| 5,397,968 | * 3/1995 | Ito et al. | ......................... 315/368.28 |
| 5,498,939 | * 3/1996 | Fukuma et al. | ...................... 315/370 |
| 5,548,190 | * 8/1996 | Okuyama et al. | .............. 315/368.26 |
| 5,793,165 | * 8/1998 | Hayashi et al. | ...................... 315/370 |

\* cited by examiner

*Primary Examiner*—Don Wong
*Assistant Examiner*—Tuyet T. Vo
(74) *Attorney, Agent, or Firm*—Ronald P. Kananen; Rader, Fishman & Grauer (57) ABSTRACT

A deflection yoke and a color cathode ray tube using the same therein and adapted for exact correction of misconvergence caused when horizontal positional deviations are induced between electron beams and a vertical deflection magnetic field. In the deflection yoke, two magnetic coil pairs are positioned opposite to each other horizontally in such a manner as to interpose the neck of a cathode ray tube therebetween. The first coil of the first coil pair is connected in series or parallel to the fourth coil of the second coil pair. The second coil of the first coil pair is connected in series or parallel to the third coil of the second coil pair. The coils thus connected are further connected in series to a vertical deflection coil. In this structure, the first and second electric coil pairs are so connected as to generate magnetic fields in mutually reverse directions. The two electric coil pairs in combination with a variable resistor constitute a bridge circuit. And the above misconvergence can be corrected by controlling the variable resistor.

4 Claims, 8 Drawing Sheets

| KIND \ CORRECTION METHOD | RELATED ART | THIS INVENTION |
|---|---|---|
| YBH | 0.15 | 0 |
| CBH | 0.39 | 0 |
| TLH | 0 | 0 |
| TLV | 1.00 | 1.00 |
| HCR | 0 | 0 |
| VCR | 0.19 | 0 |

FIG. 12A

YBH

FIG. 12B

CBH

FIG. 12C

TLH

DEFLECTION YOKE AND CATHODE RAY TUBE

BACKGROUND OF THE INVENTION

The present invention relates to a deflection yoke and a cathode ray tube, more particularly to a deflection yoke adapted for use in a color cathode ray tube, and also to a color cathode ray tube using such a deflection yoke.

Three electron beams in a color cathode ray tube are deflected by a deflection yoke for scanning a fluorescent screen to form rasters.

The deflection yoke consists of a horizontal deflection coil, a vertical deflection coil, an annular core and so forth.

When a horizontal deflection current is supplied to flow in the horizontal deflection coil, a horizontal deflection magnetic field is generated to deflect electron beams for horizontal scanning.

Similarly, when a vertical deflection current is supplied to flow in the vertical deflection coil, a vertical deflection magnetic field is generated to deflect electron beams for vertical scanning.

Most color cathode ray tubes having an inline-type electron gun are generally used such that the center beam, out of the entire three electron beams therein, is used for displaying green, while the two side beams are used for displaying red and blue respectively.

In such a cathode ray tube, there occurs misconvergence of a specific pattern when the mutual positional relationship between the electron beams and the vertical deflection magnetic field is deviated horizontally either leftward or rightward.

Figure 1A:
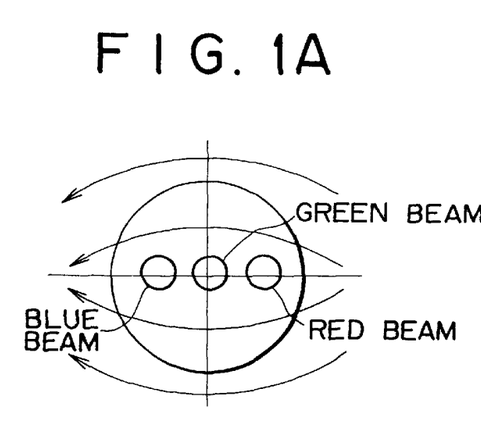
FIG. 1A shows the positional relationship between electron beams and a vertical deflection magnetic field, wherein the electron beams are deviated rightward in regard to the axis of a cathode ray tube in the case where the section around the neck of the cathode ray tube is viewed from its screen side.

For example, if an electron gun in a cathode ray tube is installed with a rightward deviation in regard to the center axis of the cathode ray tube, the electron beams are also deviated rightward, as shown in FIG. 1A.

Figure 1B:
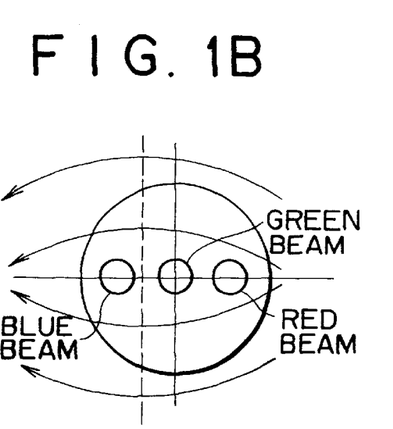
FIG. 1B also shows the positional relationship between electron beams and a vertical deflection magnetic field, wherein the vertical deflection magnetic field is deviated leftward in regard to the axis of a cathode ray tube in the case where the section around the neck of the cathode ray tube is viewed from its screen side.

Meanwhile, if a deflection yoke is installed with a leftward deviation in regard to the center axis of the cathode ray tube, the vertical deflection magnetic field is also deviated leftward, as shown in FIG. 1B.

That is, in the cases shown in FIGS. 1A and 1B, the electron beams are deviated rightward in regard to the vertical deflection magnetic field.

Figure 2:
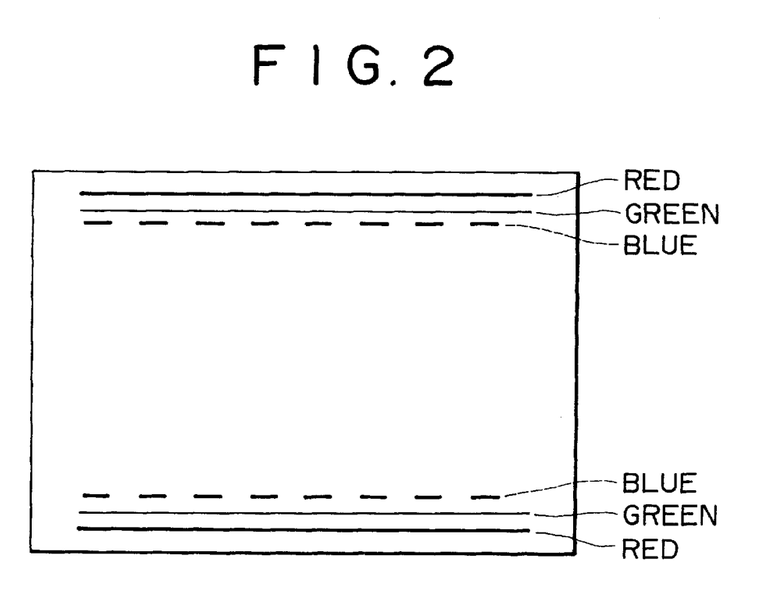
FIG. 2 illustrates a misconvergence generated on the screen of the cathode ray tube when the positional relationship between the electron beams and the vertical deflection magnetic field is such as shown in FIG. 1A or 1B.

In such a case, as shown in FIG. 2, there occurs, due to the vertical deflection, misconvergence of a pattern where red and blue rasters are deviated inward or outward from a green raster in each of upper and lower peripheral areas of a screen.

The misconvergence of this pattern is derived from the lateral asymmetrical relationship between the positions of the vertical deflection magnetic field and the electron beams. Hereinafter, it will be referred to as "misconvergence derived from lateral asymmetry"; and, the misconvergence of this pattern will be termed TLV in the description below.

For correction of such TLV, generally the following methods have been known in the related art.

The first method is carried out by employing a magnetic member. More specifically, a magnetic member is attached to either the left or the right side of the rear end of the deflection yoke, and the misconvergence TLV is corrected by laterally unbalancing the vertical-deflection magnetic field.

And the second method is carried out by employing a pair of coma-aberration correcting coils which are disposed on both left and right sides of the deflection yoke and in which vertical deflection currents are supplied to flow. More specifically, the misconvergence TLV is corrected by changing the currents that are flowing in the left and right correcting coils, thereby laterally unbalancing the magnetic field generated.

Any of the known correction methods described above is capable of executing proper correction of the misconvergence TLV, hence achieving satisfactory convergence characteristics with respect to the TLV.

However, none of the above methods is adequate to perform sole correction of the TLV alone. That is, according to the first method, the magnetic member absorbs not only the vertical deflection field but also the horizontal deflection field generated by the horizontal deflection coil. Consequently, asymmetry of the horizontal deflection magnetic field is induced as an incidental harmful effect. And this asymmetry causes other misconvergences of various patterns as well. Since the first method executes the desired correction by utilizing a leakage magnetic flux generated from the deflection yoke, it is unavoidable that the amount of the correctable TLV is somewhat limited.

Meanwhile, according to the second method, the magnetic field generated from the coma-aberration correcting coil becomes more asymmmetric in proportion to an increase of the TLV correction amount. Therefore, the symmetry for correcting the coma aberration is disordered to eventually generate misconvergences of various patterns.

Thus, it is impossible to attain improvements by adopting the first or second methods mentioned, and the convergence characteristics of any pattern, other than the TLV, are harmfully affected and rendered worse.

SUMMARY OF THE INVENTION

In view of the problems described above, it is an object of the present invention to provide a deflection yoke and a cathode ray tube using the same therein adapted for exactly correcting TLV (misconvergence derived from lateral asymmetry) without causing any harmful influence.

According to one aspect of the present invention, there is provided a deflection yoke for use in a color cathode ray tube. This deflection yoke comprises two coil pairs attached to the rear end thereof, wherein each pair consists of two coils. For example, two coils of each coil pair are wound around a common core or bobbin, and such a coil pair serves as a magnetic coil pair. The present invention employs two magnetic coil pairs, so that a total of four coils are used therein.

The two magnetic coil pairs are positioned opposite to each other horizontally in such a manner as to interpose the neck of a cathode ray tube therebetween. The first coil of the first coil pair is connected in series or parallel to the fourth coil of the second coil pair. The first and fourth coils are so polarized as to generate magnetic fields in mutually reverse directions. In this deflection yoke, these coils are termed an electric coil pair. Similarly, the second coil of the first coil pair is connected in series or parallel to the third coil of the second coil pair. The second and third coils are so polarized as to generate magnetic fields in mutually reverse directions. Consequently, two electric coil pairs are thus formed.

The magnetic poles of such electric coil pairs are positioned in the direction of array of the three electron beams emitted from an electron gun.

These coils are further connected in series to a vertical deflection coil. In this case, the first and second electric coil pairs are so connected as to generate magnetic fields in mutually reverse directions. The two electric coil pairs in combination with a variable resistor constitute a bridge circuit. This variable resistor is used for varying the rate of currents flowing in the two electric coil pairs.

In the case where a deflection yoke of the above structure is attached to a color cathode ray tube having an inline type electron gun, the following operation is performed.

Suppose first that a slider of the variable resistor is slid to one side to thereby unbalance the bridge circuit. It is assumed now that a vertical deflection current is flowing in the deflection yoke, and electron beams in the cathode ray tube are deflected upward.

As the bridge circuit is in an unbalanced state, a greater current flows in one of the two electric coil pairs while a smaller current flows in the other coil pair. It is supposed here that, in this state, the coil pair with flow of a greater current is set to such polarity as to generate an inward magnetic field, while the other coil pair with flow of a smaller current is set to such polarity as to generate a reverse, that is, outward magnetic field.

Since the field strength is proportional to the current flow, the inward magnetic field is higher in strength than the outward magnetic field. Consequently, the inward magnetic field acts on the cathode ray tube.

In the state where the electron beams are deflected upward, i.e., in the upper area of a screen, an upward force acts on one of two side beams, while a downward force acts on the other side beam. If the polarity of the vertical deflection current is changed in this state, then the electron beams are deflected downward. More specifically, in the lower area of the screen, the direction of the current flowing in the vertical deflection coil is rendered reverse to the case of deflection to the upper area of the screen. Similarly, the direction of the magnetic field generated from the electric coil pair is also rendered reverse. Consequently, an outward magnetic field acts on the cathode ray tube. In this state, a downward force acts on one of the two side beams, while an upward force acts on the other side beam.

Suppose next that the slider of the variable resistor is slid to the other side to thereby unbalance the bridge circuit. In the case where the electron beams are deflected upward on the screen, the outward magnetic field is higher in strength than the inward magnetic field, contrary to the foregoing case and, in the upper area of the screen, a downward force acts on one of the two side beams, while an upward force acts on the other side beam.

In the lower area of the screen, a reverse current flows in the vertical deflection coil. Consequently, the inward magnetic field is higher in strength than the outward magnetic field, so that an upward force acts on one of the two side beams, while a downward force acts on the other side beam.

Thus, according to the deflection yoke of the present invention and the cathode ray tube using the same therein, it is possible to achieve sole correction of the misconvergence TLV alone by controlling the variable resistor. Since this correction can be executed regardless of the horizontal deflection magnetic field and so forth, there exists no anxiety of exerting any harmful influence onto misconvergence characteristics other than the relevant TLV.

The above and other features and advantages of the present invention will become apparent from the following description, which will be given with reference to the illustrative accompanying drawings.

DETAILED DESCRIPTION OF THE PREFERRED EMBODIMENTS

Hereinafter, some preferred embodiments of the present invention will be described in detail with reference to the accompanying drawings.

Figure 3:
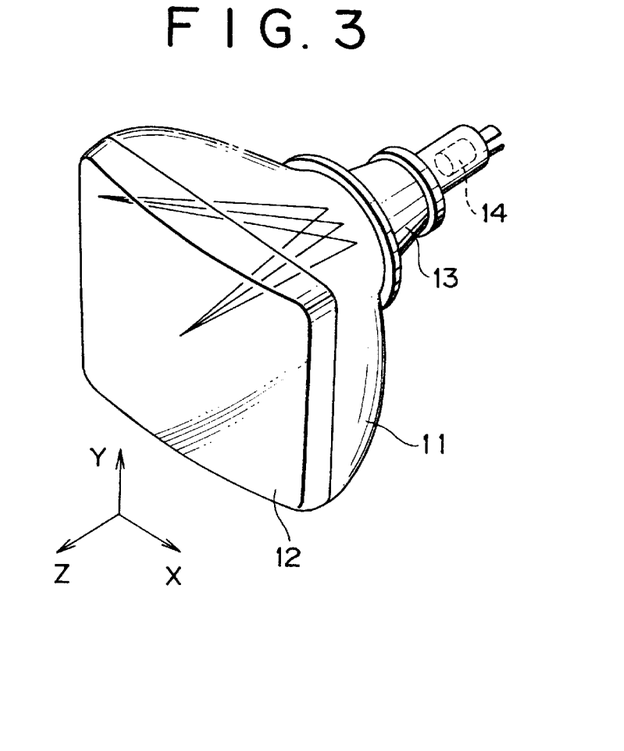
FIG. 3 is a general perspective view illustrating the deflection yoke and the color cathode ray tube of the present invention.

In FIG. 3, panel 12 having a fluorescent screen on its inner surface is installed in an opening of a funnel 11. A cone-shaped deflection yoke 13 is attached to a neck of the funnel 11. Further, an electron gun 14 is incorporated in a rear end portion of funnel 11.

Figures 4A, 4B:
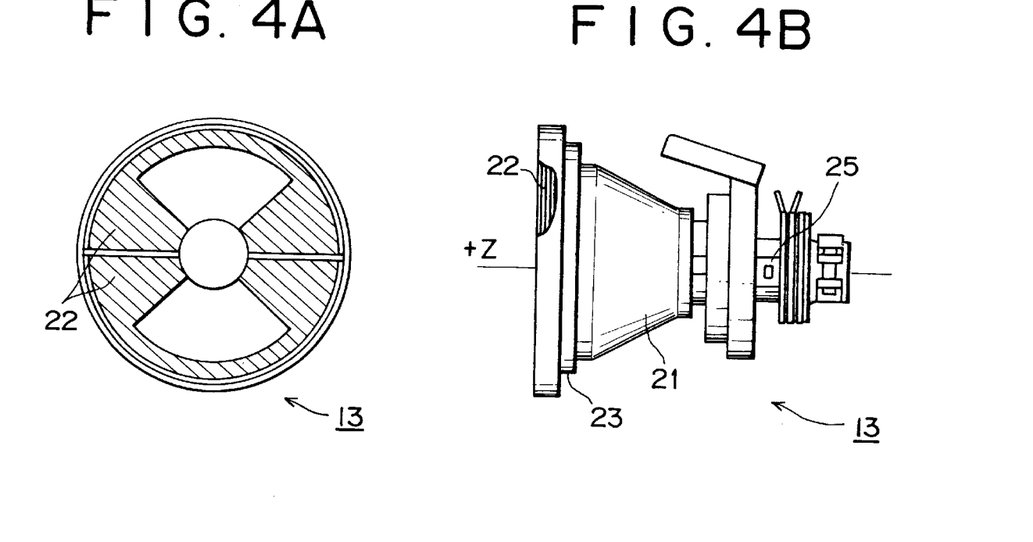
FIGS. 4A and 4B, respectively, show a front view and a side view of the deflection yoke of the invention, including a partially cutaway cross-section.

In FIGS. 4A and 4B, an annular core 21 is disposed in a manner to cover the outside of both a horizontal deflection coil 22 and a vertical deflection coil 23. Coils 25 for correcting TLV (misconvergence derived from lateral asymmetry) are attached to the rear end of deflection yoke 13. In this embodiment, coil 25 is referred to as TLV correcting coil.

The TLV correcting coils 25 are disposed opposite to each other in the horizontal direction, i.e., in the X-axis direction of the cathode ray tube shown in FIG. 3. In this embodiment, the X-axis direction of the cathode ray tube corresponds to the horizontal direction.

Figure 5:
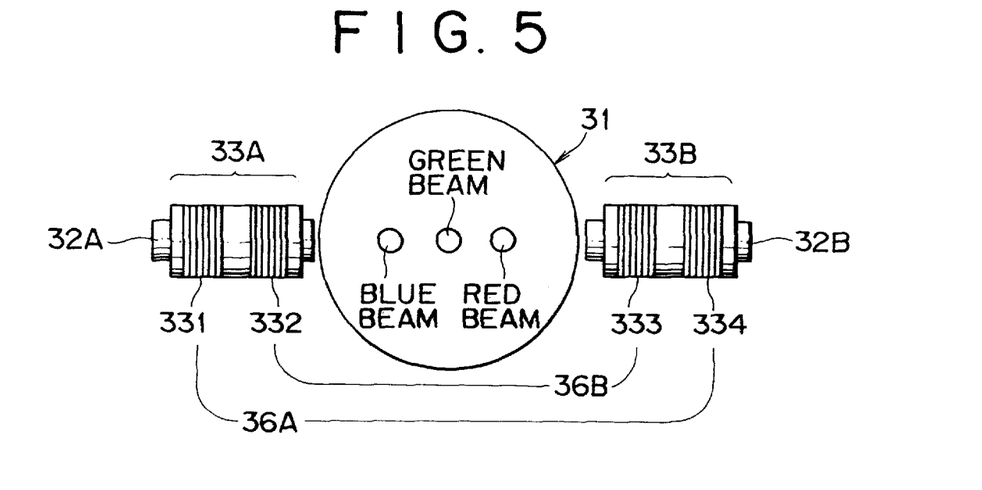
FIG. 5 shows the positional relationship between two coil pairs employed in the deflection yoke of the present invention and the electron beams in the cathode ray tube, with a cross-sectional view of the neck of the cathode ray tube seen from its panel side, wherein the relationship is illustrated among two magnetic coil pairs 33A, 33B, two electric coil pairs 36A, 36B and three electron beams.

Now the concrete structure of the TLV correcting coil 25 will be described in detail with reference to FIG. 5. Upon emission of electron beams from the inline type electron gun, a center beam for displaying green on the fluorescent screen, and side beams for displaying red and blue respectively on the fluorescent screen are arrayed as illustrated in FIG. 5. A pair of, e.g., I-shaped cores 32A and 32B are so positioned as to interpose the neck 31 of the cathode ray tube therebetween in the direction of the beam array.

A pair of coils 331, 332 are wound around the core 32A to constitute a coil pair 33A. Similarly, a pair of coils 333, 334 are wound around the core 32B to constitute a coil pair 33B. In this manner, the coils 331, 332 and the coils 333, 334 constitute magnetic coil pairs 33A and 33B.

In winding a pair of coils 331, 332 around the core 32A, it is preferred to adopt bifilar winding, which forms two coils through a single winding operation by simultaneously winding two conductors having insulated layers. According to such bifilar winding, the wound states of the coil pair 331, 332 are rendered mutually equal to consequently ensure substantially equal magnetic characteristics in both coils 331, 332. The same wound states can be achieved with regard to the coils 333, 334 around the core 32B as well. In the case of winding each coil individually, the winding operation may be so performed, under control, as to substantially equalize the characteristics of the individual coils. It is therefore to be understood that the winding is not limited merely to such bifilar winding alone.

Two coil pairs 33A, 33B are so connected that the same current flows in the coils of mutually different pairs, i.e., in coils 331 and 334, and in coils 332 and 333. The direction of generation of the magnetic field is determined by the winding direction of each coil and the direction of the current flowing in the coil.

Coils 331 and 333 are so connected as to generate magnetic fields in mutually the same direction. Meanwhile, the coils 332 and 334 are so connected as to generate magnetic fields in mutually the same direction, which is reverse to those of the coils 331 and 333.

More specifically, the coils 331 and 334 constitute an electric coil pair, and coils 332 and 333 constitute another pair. Hereinafter, the coil pair consisting of the coils 331 and 334 will be referred to as a first electric coil pair 36A, and the coil pair consisting of coils 332 and 333 will be referred to as the second electric coil pair 36B.

Figure 6:
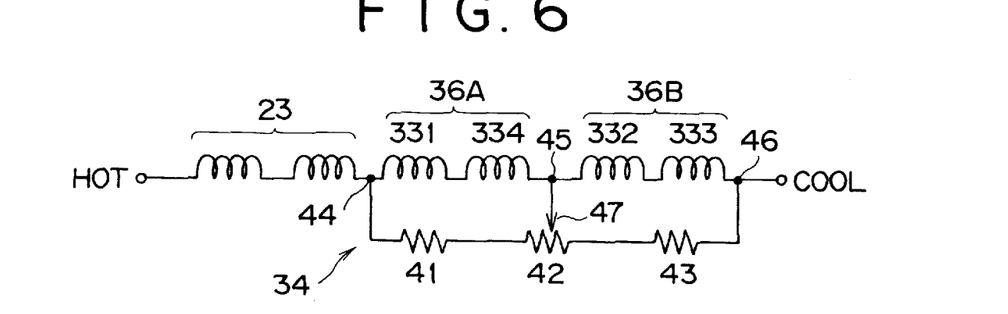
FIG. 6 is a connection diagram showing an exemplary circuit used in the deflection yoke of the present invention, wherein a bridge circuit comprising two electric coil pairs, two resistors and a variable resistors are connected in series to a vertical deflection coil.

As shown in FIG. 6, coils 331 and 334 of the first coil pair 36A are connected in series, while coils 332 and 333 of the second coil pair 36B are connected in series. Coils 331, 334, 332 and 333 are connected in series, and this series circuit is further connected in series to the vertical deflection coil 23. Consequently a current is supplied, in a vertical deflection period, via the vertical deflection coil 23 to coils 331, 334 and 332, 333.

Resistor 41, variable resistor 42 and resistor 43 are connected in series between two ends 44 and 46 of the series circuit consisting of the coils 331, 334, 332 and 333. In this case, slider 47 of variable resistor 42 is connected to junction 45 of the two coil pairs 36A and 36B. A bridge circuit 34 is thus formed with the configuration mentioned above. In this bridge circuit 34, the respective values of the resistors 41 and 43 are so preset as to attain a balanced condition of the bridge at the center position of the variable resistor 42. Therefore, when slider 47 of the variable resistor 42 is at the center position thereof, bridge circuit 34 is placed in its balanced state.

The same current flows in coils 331, 334; and, the same current flows in coils 332, 333. Consequently, the magnetic fields generated from coils 331 and 332 are substantially equal in strength but mutually reverse in direction, hence canceling each other. Similarly, the magnetic fields generated from coils 333 and 334 are substantially equal in strength but mutually reverse in direction, hence canceling each other. In this balanced state, there is executed no correction of TLV, which represents the misconvergence derived from lateral asymmetry.

Figure 7:
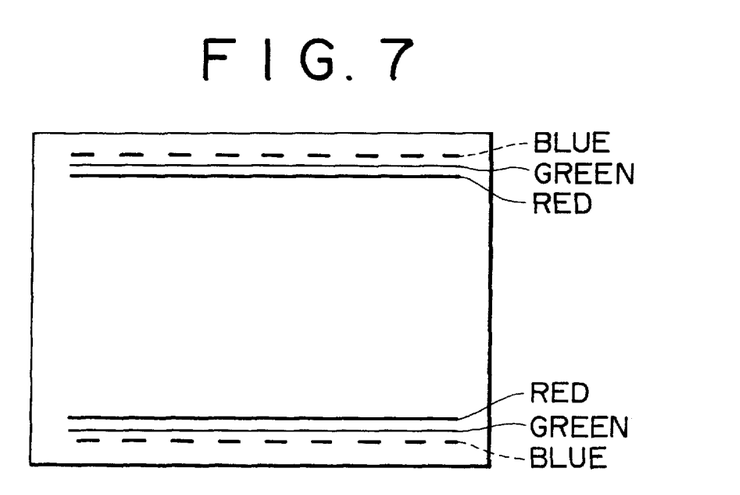
FIG. 7 illustrates a pattern of misconvergence (TLV) caused on the screen of a cathode ray tube in the case where the positional relationship of electron beams to a vertical deflection magnetic field is deviated leftward.

Next, a description will be given on the principle of correction of such TLV performed in the above structure. Suppose first that the misconvergence TLV of a certain pattern is existent as shown in FIG. 7, wherein a blue raster is deviated outward from a green raster, and a red raster is deviated inward from the green raster in both the upper and lower areas of the screen.

In this case, slider 47 of the variable resistor 42 is slid rightward in bridge circuit 34 of FIG. 6. Then bridge circuit 34 is unbalanced to cause the flow of greater currents in coils 331 and 334 than those in the coils 332 and 333.

Figure 8A:
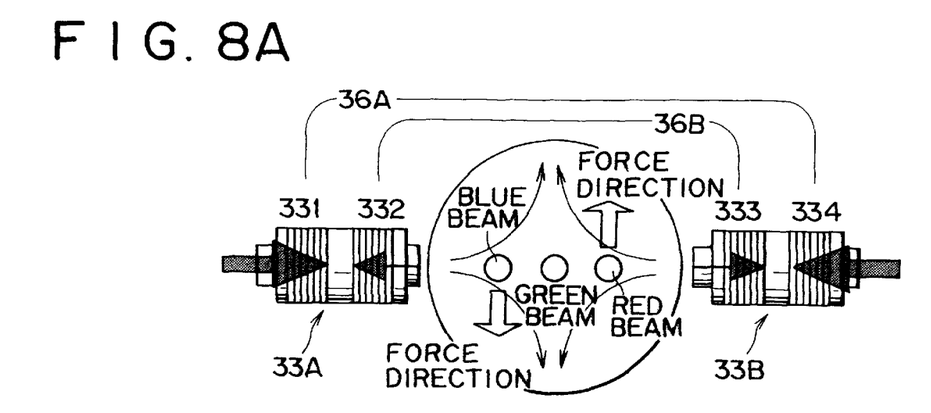
FIG. 8A shows the operation of two coil pairs used in the present invention, wherein there are indicated the strengths and directions of magnetic fields generated from the coil pairs 36A, 36B when electron beams are deflected upward on the screen of the cathode ray tube.

It is assumed here that when electron beams are deflected upward on the screen, inward magnetic fields are generated from coils 331 and 334, while outward magnetic fields are generated from coils 332 and 333, as shown in FIG. 8A. Since the currents flowing in coils 331 and 334 are greater than those flowing in coils 332 and 333, it follows that the magnetic fields generated from coils 331 and 334 are higher in strength than the magnetic fields obtained from coils 332 and 333. Consequently, four-polarity magnetic fields of the directions indicated by the arrows in FIG. 8A, i.e., magnetic fields incoming horizontally and outgoing vertically, are generated around three electron beams by the first and second coil pairs 36A and 36B. Such four-polarity magnetic fields exert a downward force onto the blue side beam while exerting an upward force onto the red side beam. As a result, in the upper area of FIG. 7, the blue raster is shifted downward while the red raster is shifted upward in relation to the green raster, whereby the misconvergence TLV in the upper area of the screen is corrected.

Figure 8B:
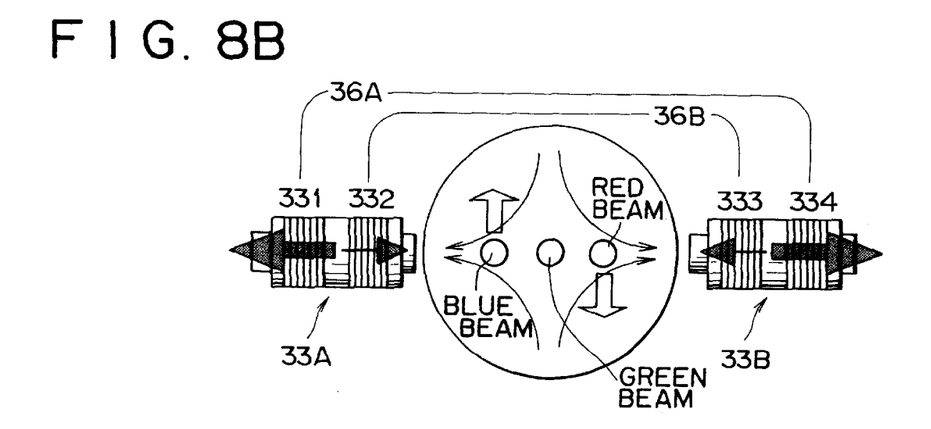
FIG. 8B shows the operation of two coil pairs used in the present invention, wherein there are indicated the strengths and directions of magnetic fields generated from the coil pairs 36A, 36B when electron beams are deflected downward on the screen of the cathode ray tube.

Meanwhile, when electron beams are deflected downward on the screen, currents flowing in the bridge circuit 34 are directionally reverse to those flowing in the foregoing case where the electron beams are deflected upward on the screen. At this time also, similarly to the foregoing case of upward deflection on the screen, the currents flowing in coils 331 and 334 are greater than those flowing in the coils 332 and 333. In this case, as shown in FIG. 8B, outward magnetic fields are generated from coils 331 and 334, while inward magnetic fields are generated from coils 332 and 333. The magnetic fields from coils 331 and 334 are higher in strength than those obtained from coils 332 and 333. Consequently, four-polarity magnetic fields of the directions indicated by arrows in FIG. 8B, i.e., magnetic fields incoming vertically and outgoing horizontally, are generated around three electron beams by the first and second coil pairs 36A and 36B. Such four-polarity magnetic fields exert an upward force onto the blue side beam while exerting a downward force onto the red side beam. As a result, in the lower area of FIG. 7, the blue raster is shifted upward while the red raster is shifted downward in relation to the green raster, whereby the misconvergence TLV in the lower area of the screen is corrected.

The shift amount of each of the blue and red rasters in relation to the green raster, i.e., the correction amount of the misconvergence TLV, is determined by the rate of the currents flowing in the first coil pair 36A and the second coil pair 36B, and such currents are controlled by the variable resistor 42.

Figure 9:
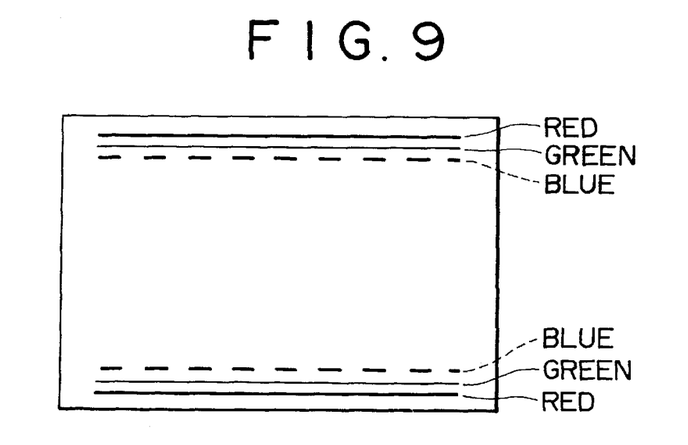
FIG. 9 illustrates a pattern of misconvergence (TLV) caused on the screen of a cathode ray tube in the case where the positional relationship of electron beams to a vertical deflection magnetic field is deviated leftward.

As shown in FIG. 9, when a misconvergence TLV of another pattern exists where the red raster is deviated outward from the green raster and the blue raster is deviated inward therefrom in the upper and lower areas of the screen, such TLV can be corrected in the following manner. That is, in bridge circuit 34 of FIG. 6, slider 47 of the variable resistor 42 is slid leftward. As a result, contrary to the foregoing example, the currents flowing in coils 332 and 333 become greater than those flowing in coils 331 and 334. Therefore, the direction of correction is rendered reverse to eventually achieve proper correction of the misconvergence TLV shown in FIG. 9.

According to the present invention, as obvious from the description given above, it is possible to correct merely the TLV that represents "misconvergence derived from lateral asymmetry", without inducing any harmful influence on the other convergence characteristics.

The upper limit of the correction amount may be freely set by selectively determining the number of windings for coils 331, 332, 333, and 334 and the value of the variable resistor 42. In the known correction method of the related art, it has been impossible heretofore to perform independent correction of the TLV alone to eventually exert some harmful influence on the other principal convergence characteristics. In addition, it has been unavoidable that the upper limit of the correction amount is somewhat restricted. The present invention is capable of solving these problems.

The preferred embodiment described above represents an exemplary case employing none of the other correcting mechanisms, such as a coma-aberration correcting coil. However, it is to be understood that the present invention is not limited thereto alone. More specifically, the invention is applicable also to a deflection yoke equipped with, e.g., a pair of coma aberration correcting coils.

Figure 10:
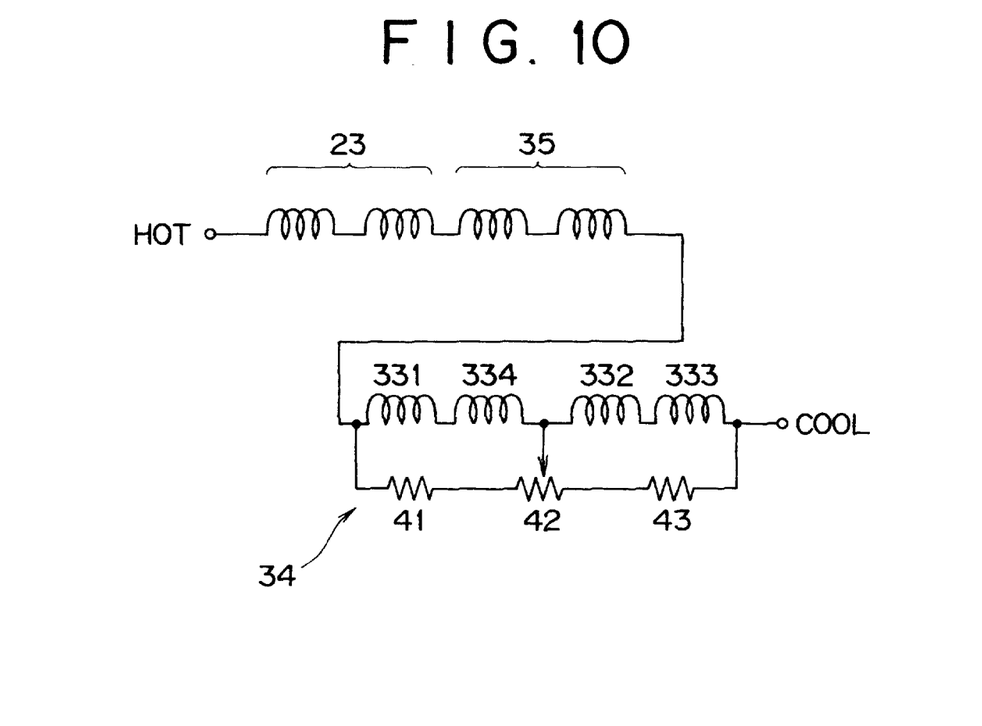
FIG. 10 is a connection diagram where coma-aberration correcting coils are used in combination in the deflection yoke of the present invention.

For example, coils 35 may be additionally attached to cores 32A and 32B in the aforementioned structure. Further, as shown in FIG. 10, these coils 35 may be connected between the vertical deflection coil 23 and the bridge circuit 34. Coils 35 are so connected as to generate a horizontal barrel magnetic field.

Even in the case where the coils 35 are used also as cores 32A and 33B, the two coil pairs 33A and 33B are wound completely independently of coils 35. Consequently, the misconvergence TLV can be corrected by controlling the variable resistor in the bridge circuit 34 of FIG. 10 without inducing any harmful influence on the correction of the vertical center raster (VCR) and so forth derived from the coils 35. When three electron beams are deflected vertically, this vertical center raster (VCR) signifies the difference between the average deflection amount of the two side beams and the deflection amount of the center beam.

As described already, there also has been known heretofore another method for correction of the misconvergence TLV, which is derived from lateral asymmetry, by the use of coma-aberration correcting coils 35. The essential point of this method resides in correcting the misconvergence TLV by horizontally unbalancing the barrel magnetic field through a decrease of the current in one of the coma-aberration correcting coils 35. However, according to this correction method, other principal convergence characteristics are harmfully affected in accordance with the increase of the TLV correction amount.

Figure 11:
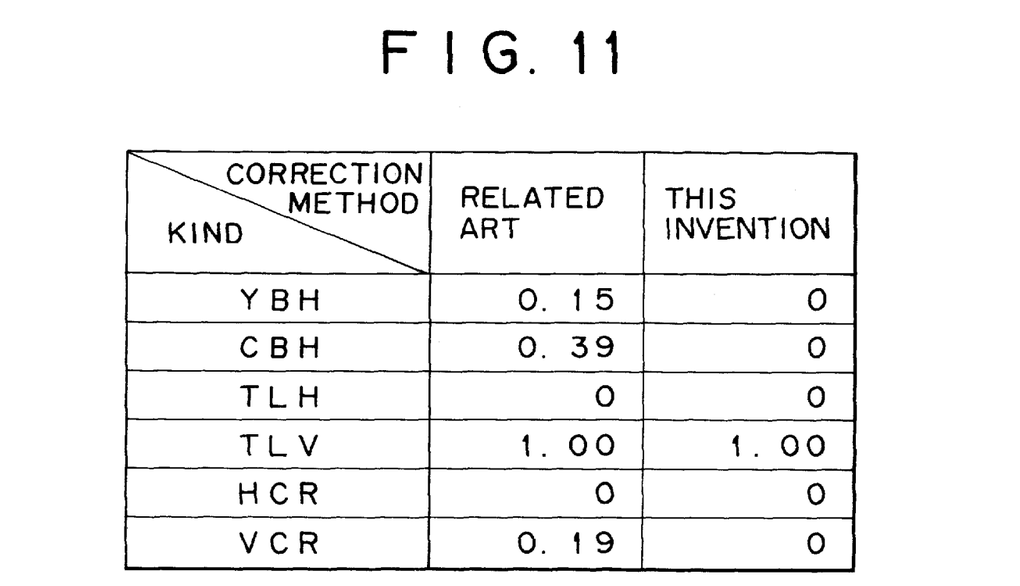
FIG. 11 is a list of changes caused in various kinds of misconvergences due to the differences of correction systems.

FIG. 11 shows some changes of convergences due to the differences among the correction methods. This diagram indicates the results of corrections obtained by the related art using coma-aberration correction coils 35 and those by the present invention, wherein the misconvergences of other patterns are changed with reference to the TLV correction amount regarded as 1.

As obvious from FIG. 11, correction of the misconvergence TLV by the present invention induces no harmful influences on any other misconvergences. It is manifest, however, that correction by the known method using the coma-aberration correcting coils 35 induces some harmful influences on most of the misconvergences of other patterns.

An explanation of the misconvergences of other patterns is given below.

Figures 12A, 12B:
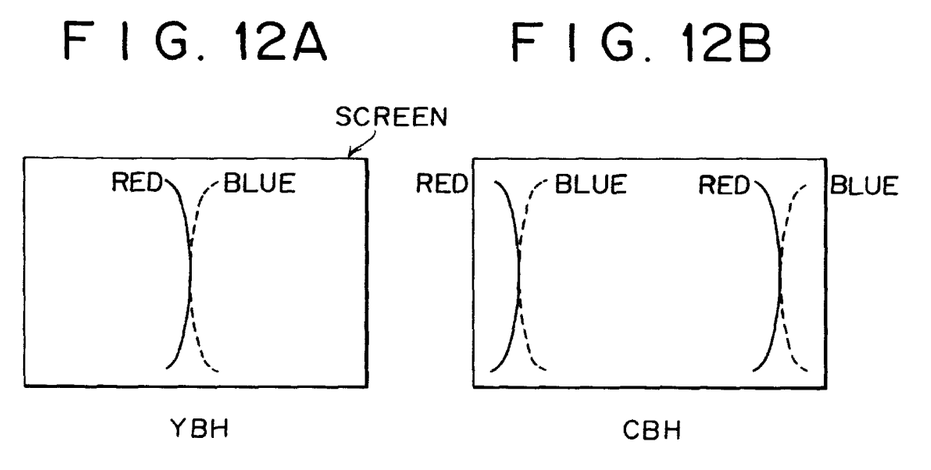
FIG. 12A is an explanatory diagram illustrating the pattern of a misconvergence termed YBH.
FIG. 12B is another explanatory diagram illustrating the pattern of a misconvergence termed CBH.
Figure 12C:
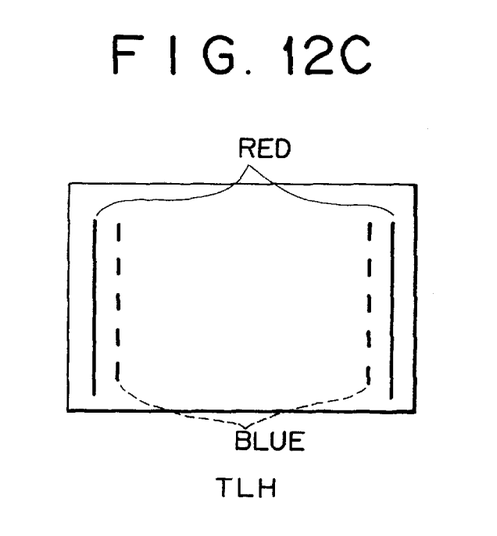
FIG. 12C is a further explanatory diagram illustrating the pattern of a misconvergence termed TLH.

First, YBH signifies the pattern of FIG. 12A where vertical lines on the Y-axis of the screen are bowed. In this state, the illustrated pattern indicative of RED-BLUE at the upper and lower ends is termed plus for convenience. Next, CBH signifies a pattern of FIG. 12B where vertical lines are bowed at the left and right corners of the screen. In this state, the illustrated pattern indicative of RED-BLUE at the upper and lower ends is termed plus for convenience. Further, TLH signifies a pattern of FIG. 12C where left vertical lines on the screen indicate RED-BLUE while right vertical lines indicate BLUE-RED. For convenience, the illustrated pattern is termed plus, and another pattern indicative of BLUE-RED on the left and RED-BLUE on the right is termed minus.

As described above, when three electron beams are deflected vertically, the VCR represents the difference between the average deflection amount of the two side beams and the deflection amount of the center beam. In this case, the pattern with green deviated upward in both upper and lower areas of the screen is termed plus for convenience.

Meanwhile, when three electron beams are deflected horizontally, the HCR (horizontal center raster) represents the difference between the average deflection amount of the two side beams and the deflection amount of the center beam. In this case, the pattern with green deviated outward in both left and right areas of the screen is termed plus for convenience.

Figure 13A:
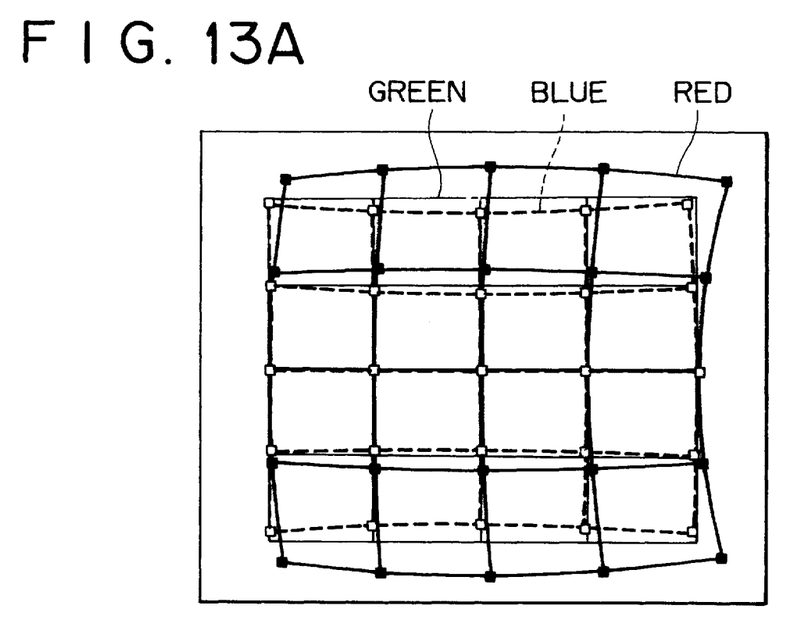
FIG. 13A is a pattern diagram showing changes of the convergences caused on the entire screen of the cathode ray tube when TLV is corrected by the known method.
Figure 13B:
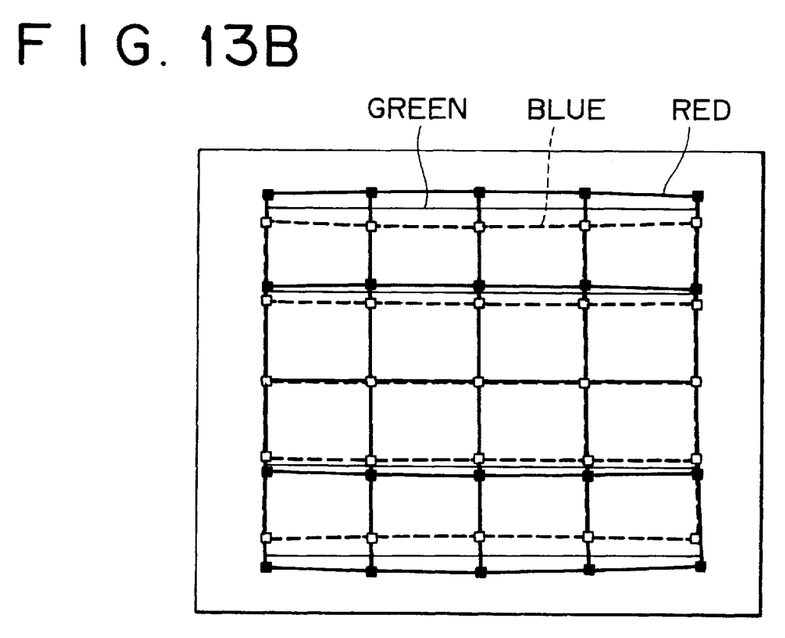
FIG. 13B is another pattern diagram showing changes of the convergences caused on the entire screen of the cathode ray tube when TLV is corrected by the coil pairs used in the present invention.

As is obvious from the patterns of FIGS. 13A and 13B, it is seen that correction according to the present invention induces none of the harmful influences on the other principal convergences, which is different from the conventional known correction.

Figure 14:
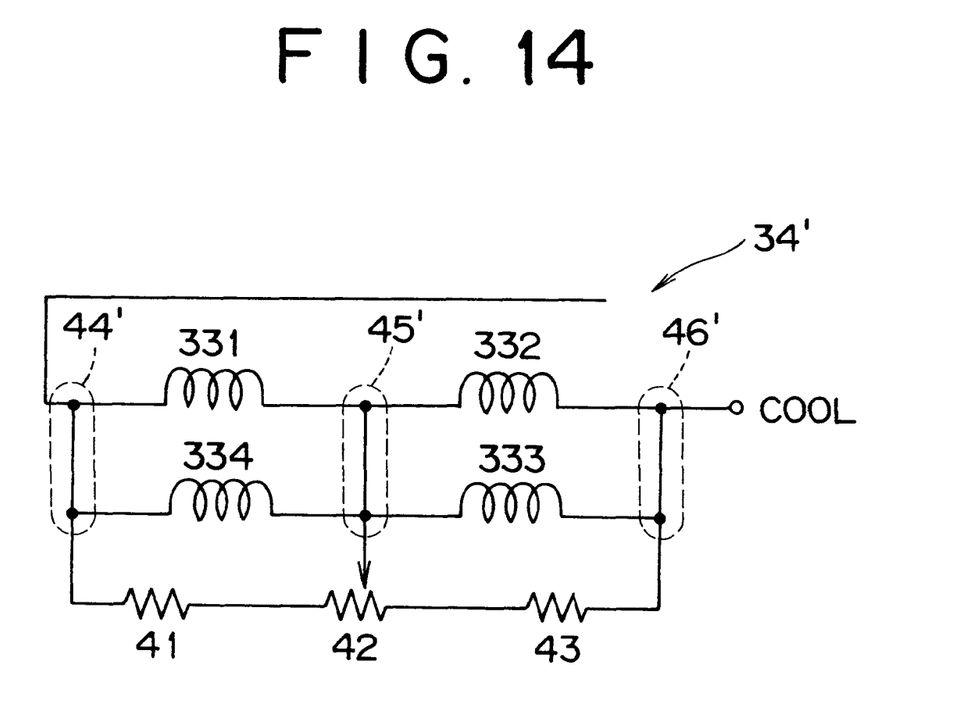
FIG. 14 is a connection diagram showing another exemplary bridge circuit used in the deflection yoke of the present invention.

In the preferred embodiment mentioned above, coils 331 and 334 are connected in series and coils 332 and 333 are connected in series, respectively. However, as shown in another connection diagram of FIG. 14, coils 331 and 334 may be connected in parallel, and coils 332 and 333 may be connected in parallel, respectively. In this case also, exactly the same function and effect are achievable as in the foregoing example with a series connection.

In forming a bridge circuit 34' in the configuration with the parallel connection, the coils 331 and 334, 334 and 332, 332 and 333, resistors 41 and 43 and variable resistor 42, are connected mutually at junctions 44', 45' and 46' in FIG. 13.

Thus, as described hereinabove, it becomes possible, by the use of the deflection yoke and the cathode ray tube of the present invention, to attain exact correction of the misconvergence TLV derived from lateral asymmetry.

What is claimed is:

1. A deflection yoke for use in a color cathode ray tube, comprising:
   a horizontal deflection coil;
   a vertical deflection coil;
   an annular core;
   a first magnetic coil pair consisting of a first coil and a second coil; and
   a second magnetic coil pair consisting of a third coil and a fourth coil;
   wherein said first magnetic coil pair and said second magnetic coil pair are so positioned as to be opposite horizontally to the rear end of said deflection yoke; said first and fourth coils are connected in series to constitute a first electric coil pair for generating magnetic fields in mutually reverse directions, while said second and third coils are connected in series to constitute a second electric coil pair for generating magnetic fields in mutually reverse directions; and said first and second electric coil pairs are connected in series to generate magnetic fields in mutually reverse directions; wherein said first and second electric coil pairs in combination with a variable resistor constitute a bridge circuit, and said bridge circuit is connected in series to said vertical deflection coil.

2. A deflection yoke for use in a color cathode ray tube, comprising:
   a horizontal deflection coil;
   a vertical deflection coil;
   an annular core;
   a first magnetic coil pair consisting of a first coil and a second coil; and
   a second magnetic coil pair consisting of a third coil and a fourth coil;
   wherein said first magnetic coil pair and said second magnetic coil pair are so positioned as to be opposite horizontally to the rear end of said deflection yoke; said first and fourth coils are connected in parallel to constitute a first electric coil pair for generating magnetic fields in mutually reverse directions, while said second and third coils are connected in parallel to constitute a second electric coil pair for generating magnetic fields in mutually reverse directions; and said first and second electric coil pairs are connected in series to generate magnetic fields in mutually reverse directions; wherein said first and second electric coil pairs constitute a bridge circuit in combination with a variable resistor, and said bridge circuit is connected in series to said vertical deflection coil.

3. A color cathode ray tube having a deflection yoke and an inline type electron gun disposed horizontally, said deflection yoke comprising:
   a horizontal deflection coil;
   a vertical deflection coil;
   an annular core;
   a first magnetic coil pair consisting of a first coil and a second coil; and
   a second magnetic coil pair consisting of a third coil and a fourth coil;
   wherein said first magnetic coil pair and said second magnetic coil pair are so positioned as to be opposite horizontally to the rear end of said deflection yoke; said first and fourth coils are connected in series to constitute a first electric coil pair for generating magnetic fields in mutually reverse directions, while said second and third coils are connected in series to constitute a second electric coil pair for generating magnetic fields in mutually reverse directions; and said first and second electric coil pairs are connected in series to generate magnetic fields in mutually reverse directions; wherein said first and second electric coil pairs constitute a bridge circuit in combination with a variable resistor, and said bridge circuit is connected in series to said vertical deflection coil.

4. A color cathode ray tube having a deflection yoke and an inline type electron gun disposed horizontally, said deflection yoke comprising:
   a horizontal deflection coil;
   a vertical deflection coil;
   an annular core;
   a first magnetic coil pair consisting of a first coil and a second coil; and
   a second magnetic coil pair consisting of a third coil and a fourth coil;
   wherein said first magnetic coil pair and said second magnetic coil pair are so positioned as to be opposite horizontally to the rear end of said deflection yoke; said first and fourth coils are connected in parallel to constitute a first electric coil pair for generating magnetic fields in mutually reverse directions, while said second and third coils are connected in parallel to constitute a second electric coil pair for generating magnetic fields in mutually reverse directions; and said first and second electric coil pairs are connected in series to generate magnetic fields in mutually reverse directions; wherein said first and second electric coil pairs in combination with a variable resistor constitute a bridge circuit, and said bridge circuit is connected in series to said vertical deflection coil.

* * * * *